United States Patent
Pipitone et al.

(10) Patent No.: US 12,039,598 B1
(45) Date of Patent: Jul. 16, 2024

(54) COMPUTER SYSTEM AND NETWORK FOR MULTIPLE INTRADAY AND INTERUSER ACQUIRING/DISCHARGING OF SHORT SALE SECURITIES LOCATES

(71) Applicant: Locates Inc., Wellington, FL (US)

(72) Inventors: Daniel Pipitone, Brooklyn, NY (US); John Caruso, New City, NY (US)

(73) Assignee: TRADE Zero USA INC., Lake Worth, FL (US)

(*) Notice: Subject to any disclaimer, the term of this patent is extended or adjusted under 35 U.S.C. 154(b) by 134 days.

(21) Appl. No.: 16/906,746

(22) Filed: Jun. 19, 2020

Related U.S. Application Data

(60) Provisional application No. 62/863,575, filed on Jun. 19, 2019.

(51) Int. Cl.
| | |
|---|---|
| *G06Q 40/04* | (2012.01) |
| *G06F 3/0482* | (2013.01) |
| *G06F 3/04847* | (2022.01) |
| *G06F 16/9535* | (2019.01) |
| *G06Q 20/02* | (2012.01) |
| *H04L 41/0803* | (2022.01) |
| *H04L 67/01* | (2022.01) |

(52) U.S. Cl.
CPC .......... *G06Q 40/04* (2013.01); *G06F 3/0482* (2013.01); *G06F 3/04847* (2013.01); *G06F 16/9535* (2019.01); *G06Q 20/02* (2013.01); *H04L 41/0803* (2013.01); *H04L 67/01* (2022.05)

(58) Field of Classification Search
CPC .............................. G06Q 40/00; G06Q 40/04
USPC .............................................. 705/36 R, 35, 38
See application file for complete search history.

(56) References Cited

U.S. PATENT DOCUMENTS

| | | | | |
|---|---|---|---|---|
| 5,101,353 A | * | 3/1992 | Lupien | ................... G06Q 40/04 |
| | | | | 340/4.5 |
| 5,563,783 A | | 10/1996 | Stolfo | |
| 5,761,442 A | * | 6/1998 | Barr | ..................... G06N 3/0454 |
| | | | | 705/36 R |

(Continued)

FOREIGN PATENT DOCUMENTS

| | | |
|---|---|---|
| KR | 101239774 B1 | 11/2012 |
| KR | 20160007298 A | 1/2016 |
| WO | WO2017091530 | 6/2017 |

*Primary Examiner* — Kirsten S Apple
(74) *Attorney, Agent, or Firm* — Thomas A. O'Rourke; James Bongiorno; O'Rourke IP Law, PLLC

(57) ABSTRACT

In a network for acquiring/discharging short sale stock locates, a server provides for displaying a graphic user interface (GUI) that includes: watchlist; pending locate; history; and inventory screens. Client devices of institutions and others seeking to sell stock locates transmit availability to the server. Investor client devices that enter symbol(s) corresponding to the availability have displayed, in their watchlist, data relating to the available locate including a rate, and can request particular locate share quantities using a locate button. The acquired locate shares are removed from the availability, and are listed in the inventory screen of the investor. The investor can request/enter a rate different than the institution's rate; and can offer for sale any unused or unneeded locate shares in his/her inventory at any time to the others using the pending locate screen, and can receive offers, which accepted or rejected offers appear in the history screen.

10 Claims, 22 Drawing Sheets

(56) References Cited

U.S. PATENT DOCUMENTS

| | | | |
|---|---|---|---|
| 6,014,643 A | 1/2000 | Minton | |
| 6,026,381 A * | 2/2000 | Barton, III | G06Q 40/06 705/36 R |
| 6,408,282 B1 | 6/2002 | Buist | |
| 6,709,330 B1 * | 3/2004 | Klein | A63F 13/005 463/9 |
| 6,766,304 B2 | 7/2004 | Kemp | |
| 6,772,132 B1 | 8/2004 | Kemp | |
| 6,996,539 B1 * | 2/2006 | Wallman | G06Q 40/00 705/36 T |
| 7,165,044 B1 * | 1/2007 | Chaffee | G06Q 40/00 705/35 |
| 7,181,423 B2 * | 2/2007 | Blanchard | G06Q 40/00 705/35 |
| 7,349,991 B2 | 3/2008 | Lockwood | |
| 7,373,324 B1 * | 5/2008 | Engin | G06Q 40/00 705/35 |
| 7,567,935 B2 | 7/2009 | Tell | |
| 7,693,775 B2 * | 4/2010 | Korhammer | G06Q 40/04 705/37 |
| 8,185,466 B2 | 5/2012 | Martinez | |
| 8,332,299 B1 * | 12/2012 | Lawson, III | G06Q 40/00 705/36 R |
| 8,738,514 B2 | 5/2014 | Chan | |
| 8,768,820 B2 | 7/2014 | Labuszewski | |
| 2002/0174047 A1 * | 11/2002 | Fernholz | G06Q 40/06 705/36 R |
| 2003/0009411 A1 | 1/2003 | Ram | |
| 2003/0093343 A1 | 5/2003 | Huttenlocher | |
| 2005/0038727 A1 | 2/2005 | Ballman | |
| 2005/0044035 A1 * | 2/2005 | Scott | G06Q 40/06 705/37 |
| 2006/0059065 A1 * | 3/2006 | Glinberg | G06Q 40/08 705/35 |
| 2006/0085321 A1 * | 4/2006 | Staib | G06Q 30/08 705/37 |
| 2007/0162365 A1 * | 7/2007 | Weinreb | G06Q 40/00 705/35 |
| 2008/0313068 A1 * | 12/2008 | Sun | G06Q 40/04 705/37 |
| 2009/0070274 A1 * | 3/2009 | Bukowski | G06Q 20/10 705/36 R |
| 2010/0004999 A1 | 1/2010 | DePetris | |
| 2010/0005022 A1 | 1/2010 | DePetris | |
| 2010/0274703 A1 | 10/2010 | Olson | |
| 2011/0225093 A1 | 9/2011 | Cahn | |
| 2013/0046674 A1 * | 2/2013 | Fenichel | G06Q 40/04 705/37 |
| 2013/0246238 A1 * | 9/2013 | Chen | G06Q 40/06 705/37 |
| 2014/0289163 A1 * | 9/2014 | Michaud | G06Q 40/06 705/36 R |
| 2015/0287140 A1 * | 10/2015 | Wang | G06Q 40/06 705/36 R |
| 2015/0317736 A1 * | 11/2015 | Lian | G06Q 40/06 705/36 R |
| 2015/0348195 A1 * | 12/2015 | Weber | G06Q 10/067 705/36 R |
| 2016/0104241 A1 * | 4/2016 | Ma | G06Q 40/04 705/37 |
| 2016/0148311 A1 | 5/2016 | Kim | |
| 2016/0321752 A1 * | 11/2016 | Tabacco | G06Q 20/3674 |
| 2018/0130126 A1 * | 5/2018 | Yaari | G06Q 40/06 |
| 2018/0276754 A1 * | 9/2018 | Agbamu | G06N 20/00 |
| 2019/0130506 A1 * | 5/2019 | Walsh | G06F 3/04817 |
| 2019/0172145 A1 * | 6/2019 | Kim | G06Q 40/06 |

* cited by examiner

FIG. 2

(Pending Locate Window)

FIG. 2B
(Watchlist Window)

| | 1 | 2 | 3 | 4 | 5 | 6 | 7 | 8 | 9 | 10A | 10 |
|---|---|---|---|---|---|---|---|---|---|---|---|
| | Symbol | Last | Last Time | Open | Prev Close | Change | From Open | Inventory | Limit | Action | |
| | CSCO | 0.0350 | 09:20:35 | 0.0247 | 0.0245 | 0.0030 | 0.005 | 0 | 0.0350 | 100 | Locate |
| | MSFT | 0.0823 | 11:50:12 | 0.0925 | 0.0919 | -0.0102 | -0.0046 | 0 | 0.0823 | 100 | Locate |
| | GE | 0.0651 | 14:05:45 | 0.0643 | 0.0655 | 0.0008 | -0.0004 | 0 | 0.0651 | 100 | Locate |
| | C | 0.0259 | 12:54:47 | 0.0258 | 0.0263 | 0.0001 | -0.0004 | 0 | 0.0259 | 100 | Locate |
| | AMD | 0.0127 | 09:45:12 | 0.0127 | 0.0164 | 0.0000 | 0.0002 | 0 | 0.0127 | 100 | Locate |
| | AA | 0.0323 | 10:15:22 | 0.0325 | 0.0327 | -0.0002 | 0.0004 | . | 0.0323 | | |
| | AC | | | | | | | | | | |
| | ARM | 0.0178 | 09:45:08 | 0.0177 | 0.0184 | 0.0001 | 0.0009 | 1000 | 0.0178 | 100 | Locate |
| | BBB | 0.0235 | 09:55:16 | 0.0203 | 0.0224 | 0.0012 | 0.0001 | 0 | 0.0235 | 100 | Locate |
| | A | 0.0476 | 10:14:18 | 0.0478 | 0.0476 | -0.0002 | 0.0000 | 0 | 0.0476 | 100 | Locate |
| | Z | 0.0127 | 09:55:24 | 0.0123 | 0.0125 | 0.0004 | 0.0002 | 1200 | 0.0127 | 100 | Locate |
| | TR | 0.0256 | 10:13:41 | 0.0245 | 0.0241 | 0.0011 | 0.0015 | 0 | 0.0256 | 100 | Locate |
| | ABC | 0.0473 | 09:55:34 | 0.0487 | 0.0495 | -0.0014 | -0.0022 | | 0.0400 | 100 | Locate |
| | ACL | 0.0214 | 09:42:28 | 0.0215 | 0.0198 | -0.0001 | 0.0015 | 0 | 0.0214 | 100 | Locate |
| | RC | 0.0105 | 09:14:12 | 0.0102 | 0.0099 | 0.0003 | 0.0006 | 0 | 0.0105 | 100 | Locate |

103

(Inventory Tab of the Inventory-History Window)

FIG. 2D
(History Tab of the Inventory-History Window)

| Time | Type | Symbol | Status | Shares | Price | Total |
|---|---|---|---|---|---|---|
| 12:08:20 | Locate | CARV | Expired | 100 | 0.0189 | 1.89 |
| 11:57:11 | Locate | CARV | Canceled | 100 | 0.0180 | 1.80 |
| 10:59:10 | Locate | SPY | Filled | 100 | 0.0356 | 3.56 |

104

FIG. 5A
(Example- Step 1)

FIG. 5B
(Example– Step 2)

| Symbol | Last | Last Time | Open | Prev Close | Change | From Open | Inventory | Limit | Action | | |
|---|---|---|---|---|---|---|---|---|---|---|---|
| CAPV | 0.0199 | 09:20:35 | 0.0147 | 0.0245 | 0.0030 | 0.005 | 0 | 0.0199 | 200 | | |
| MSFT | 0.0823 | 11:50:12 | 0.0925 | 0.0919 | -0.0102 | -0.0096 | 0 | 0.0823 | 100 | | Locate |
| GE | 0.0651 | 14:05:45 | 0.0643 | 0.0655 | 0.0008 | -0.0004 | 0 | 0.0651 | 100 | | Locate |
| IBM | | | | | | | | | | | Locate |

(Example- Step 3)

FIG. 5D
(Example- Step 4)

| Locate Symbol | | | | | | | |
|---|---|---|---|---|---|---|---|
| Symbol: CARV    Shares: 200 | | | | | | | |
| ☐ Apply Search    [Locate]   [Clear Filters] | | | | | | | |
| Symbol | Type | Price | Shares | Status | Total | Action | Time |
| | | | | | | | |
| | | | | | | | |

FIG. 5E
(Example- Step 5)

FIG. 5F
(Example- Step 6)

| Symbol | Type | Price | Shares | Status | Total | Action |
|---|---|---|---|---|---|---|
| CARV | Locate | .0189 | 200 | Offered | 3.78 | Accept Cancel |

Locate Symbol

Symbol: CARV    Shares: 200

☐ Apply Search

[Locate]

[Clear Filters]

FIG. 5G
(Example- Step 7)

| Symbol | Available | Unavailable | Action |
|--------|-----------|-------------|--------|
| CARV   | 200       | 0           | 200 ◆ Credit |

Inventory | History

FIG. 5H
(Example- Step 8)

FIG. 5I
(Example- Step 9)

| Symbol | Available | Unavailable | Action |
|--------|-----------|-------------|--------|
| CARV   |           | 200         |        |

Inventory | History

FIG. 5J
(Example- Step 10)

| Symbol | Available | Unavailable | Action |
|--------|-----------|-------------|--------|
| CARV   | 200       | 0           | 200 [Credit] |

Inventory | History

FIG. 5K
(Example- Step 11)

FIG. 5L
(Example- Step 12)

FIG. 5M
(Example- Step 13)

COMPUTER SYSTEM AND NETWORK FOR MULTIPLE INTRADAY AND INTERUSER ACQUIRING/DISCHARGING OF SHORT SALE SECURITIES LOCATES

CROSS REFERENCES TO RELATED APPLICATIONS

This application claims priority on U.S. Provisional Application Ser. No. 62/863,575, filed on Jun. 19, 2019, the disclosures of which are incorporated herein by reference.

FIELD OF INVENTION

This invention is directed to an improved computer system network and graphical user interface (GUI) that facilitates improved electronic trading of equities. Specifically, the herein disclosed computer system network and GUI provides an electronic investor with the ability to buy and "sell" locates intraday for shorting equities, a capability that is not available in the marketplace today. The computer system GUI provides the electronic trader with the unique ability to transact within the network for the purpose of acquiring and discharging of stock locates, from conventional sources and also from other individuals transacting within the network.

BACKGROUND OF THE INVENTION

Computer systems may be coupled together to form a network to share data and resources. Each computer system in a network may be configured to display a particular graphical user interface (GUI). Improvements to the operation of the computer network am advantageously made through changes to either or both the hardware and software, with the latter being particularly with respect to the graphical user interface provided that may leverage external functionality. An improved computer system GUI and network arrangement may be particularly beneficial when used for trading securities in the marketplace.

The conventional securities marketplace includes the typical "long" sale of a security (e.g., a stock), and the "short sale."

The "long" sale involves selling of a security by a seller/trader who actually owns the security.

The "short" sale involves the selling a security that is not presently owned by the trader, and which is instead merely borrowed to facilitate the transaction in compliance with regulations promulgated by the Securities and Exchange Commission (i.e., Regulation SHO adopted under the Securities Exchange Act of 1934 requires short sellers to "locate" securities to borrow before selling, see http://www.sec.gov/rules/final/34-50103.htm).

With a "short" sale, a trader has an expectation that the market price of a security will decline, and who therefore borrows the security and sells it at the present time, with an obligation to make a purchase of that same security in the open marketplace and return it to the lender. The short seller is speculating that with a lower market price in the future, he/she can subsequently buy the same security at the lower price, and return it to the lender to close out his/her position, profiting an amount being the difference between the original sales price and the expected lower purchase price. However, if the price of the security increases, the trader will have to purchase the security but must do so at a higher price to return it to the borrower, and thus loses an amount being the difference between the higher subsequent purchase price made in the open market and the original sales price of the borrowed security.

The most prolific lenders of securities in the United States are custody banks that act as agents on behalf of large institutional owners (e.g., pension funds, public retirement funds, mutual funds, endowments, etc.), as well as hedge funds and clearing firms that are in the business of loaning out securities for shorting. Brokers also lend securities to further profit on an inventory of securities that may otherwise remain idle, and to enable their customers to complete short sales.

Day trading short sellers often do not maintain a short position beyond the trading day because they watch the market and advantageously time the purchase of the security when it will be profitable. Although the securities loan may ultimately be time limited in accordance with a preset settlement date, the structure of this lending/borrowing arrangement for a day trading short sale operates on a day to day basis. The loan essentially is for a period of one day, and is automatically self-renewing overnight, with the borrower needing to make arrangements with the trading desk of the lender for the return of the borrowed security at the end of the day when he/she has completed the purchase.

In particular, day trading short sellers often do not maintain a short position beyond the trading day. In effect, they never actually borrow the stock but effectively secure the approval to borrow in the case that they decide to hold the short position beyond the trading day. In this case, the locate serves as a "reasonable basis" to believe that the security can be borrowed. At the end of the trading day if the day trading short seller has no short positions, the locate automatically terminates. If the day trading short seller ends the day with a short position, the locate expires, and the short stock is then borrowed from the lender to ensure the stock can be delivered at settlement.

In today's trading environment, this arrangement fails to provide enough liquidity for the market. Many short sale traders, including day traders, want to transact more rapidly, and may wish to only hold a borrowed security for a fractional portion of a day, and need to find (i.e., obtain "locates" for particular securities) more easily and quickly, and similarly dispose of the locate at a moment's notice.

Regulation SHO requires the broker-dealer to have reasonable grounds to believe that the security can be borrowed so that it can be delivered on the date delivery is due before effecting a short sale order in any equity security. This "locate" must be made and documented prior to effecting the short sale. Therefore, selling a security short without having locate to ensure the stock can be borrowed for delivery (i.e., a "naked" sale) violates Regulation SHO.

A trader can obtain a locate from the lender by telephone, email, and instant message, the availability of which may be identified by reviewing a locate file provided by the broker to the trader at the start of each day, which lists the inventory of locates that the broker may loan. The trade desks of many lenders have the means by which to provide electronic access to their respective file/pools of liquidity for short locate shares, (meaning the amount of long shares that their aggregate base of clients hold, that could be lent out for shorting), including the number of shares available to obtain locates for, and the rate (i.e., price per share) for obtaining that locate.

In today's fast-moving markets, the ability to pull and digest information quickly is paramount when making trading decisions. This is particularly true when evaluating whether stocks can be shorted, and if so, what is the process and cost for doing so. Making this process not only fast, but also easy can assist in creating a competitive advantage for an investor. Cutting down the time needed to arrive at a successful locate will increase the speed of information procurement and ultimately add to the investor's competitive advantage. As the markets are fluid and fast moving, not having this information at an investor's fingertips could result in missed opportunities which could amount to profits in the millions of dollars.

In the universe of trading stocks on the short side, there is always the risk of the locate providers running out of supply of locates. When this happens, investors are unable to place any opening short orders for those stocks. This is another area where not being able to go short could potentially cost investors millions of dollars in lost opportunity.

In existing systems that offer the ability to locate stocks, the investor is limited to pricing one at a time. In addition, they are limited to buying one locate at a time. Existing systems do not provide for the ability for Investor A to "sell" his/her locates to Investor B, which enables another investor (Investor B) to utilize the locate that is no longer needed by Investor A, and subsequently recycle the locate for use by other investors all within a single trading day. Existing systems are unable to price and buy multiple locates on a single screen. Existing system facilitate only a one to one relationship between investor located shares and vendor supplied shares. In actuality, the locate is between the firm (broker/dealer) and the locate vendor, thus existing systems do not allow for the maximization of the short locates reserved in relation to open short orders and positions.

The herein disclosed computer system network and graphical user interface (GUI) solves these structural problems encountered by today's short sale securities trader.

SUMMARY OF THE INVENTION

In today's volatile markets, many traders look to capitalize on both up and down movements of stock prices. One strategy of capitalizing when a stock goes down is called short selling or shorting. The trader will short sell a stock at one price with the goal of buying the stock back at a lower price. This difference would be their profit. In most instances, an investor cannot just sell short shares in the same way in which they can buy shares. To place an opening short sell, the trader must first source or "locate" shares that someone else who is currently long the stock will lend to them. Upon locating the shares, the trader can then place an opening short order for up to the amount of shares located. Many times, traders will find it difficult to source shares for shorting. Many times, traders will locate shares and the short trade never sets up the way it was intended, so the shares are never shorted. Many times a trader will locate, then short, then cover and then have no further need for the located shares. In each of these very common scenarios, our invention helps the trader by allowing them to potentially monetize these located shares that are no longer needed. It helps with satisfying the demand that exists for other traders to short that same stock on that same day, and finally it helps the broker dealer by maximizing the use of the shares located by its clients, and making more shares available to more of its client base.

Referring to FIG. 2, the trader would use this window to create a list of symbols that would potentially be shorted on the current trading day. The symbols are entered into the grid under the Symbol column header. As each symbol is entered a corresponding locate price is shown. The trader can increment the number of shares and then press the locate button to submit the locate request. The pending locate requests appear in the Window 102. The trader can either accept or reject the locate request from there. Upon accepting the request by clicking the Accept button in Window 102, the trader has the fee decremented form their account, and the located shares will appear in the inventory tab of section 104. The shares are listed in inventory as available. Upon accepting the locate, the trader can also now initiate a short order (done in another window in current embodiment) for up to the number of shares located. When the trader no longer needs the locate they have a facility to sell any located shares by entering in the number of shares and then clicking the Credit button in 104. Upon doing this, the amount of Available shares is decremented by the amount of shares being sold in 104, and the pending locate sell order is again reflected in the open locate order window, in section 102. The trader can choose to Cancel that locate sell order by clicking cancel. The Sell order will fill when another trader chooses to locate that same symbol. Upon the sell order being filled, the locate inventory for that symbol would reduce by the amount of located shares sold, and the trader would be credited for the amount sold.

The herein disclosed computer system, GUI and network arrangement overcomes the drawbacks of the existing systems' means and processes of obtaining locates. It provides the investor with a mechanism by which he can "sell" the unused, unusable or generally unwanted locates. When locates are "sold", the quantity of located shares is no longer usable by the seller unless the seller cancels the "sell" order. Once the order fills, the locate is transferred, via the network to the buyer where they can immediately use the located shares for initiating a short order in respective shares. (Note that the term "sell" and the phrase "Mark for Credit" are used throughout this disclosure interchangeably, and on the GUI of the preferred embodiment discussed hereinafter, a button that is used to initiate a "sell" or "Mark for Credit" order is labeled more simply as "Credit"). The current iteration fills locate sell orders on a first-in-first-out basis. If Investor A marks his shares of ABC for credit, and subsequently, Investor B requests a locate in ABC, then the located shares will transfer between Investor A, through the network to Investor B, to be used to facilitate Investor B's opening short order in ABC.

The chain of custody for the locate throughout each trading day is maintained using a Blockchain, for the immutable recording of the chain of custody to the millisecond, but is not limited to this increment of time. This, in turn, allows for the broker dealer to demonstrate compliance for regulatory purposes, ensuring that a locate was in place prior to an opening short order.

The computer system, GUI and network arrangement is scalable in relation to the number of vendors or wholesalers that are providing locate supply, but also those broker/dealers, trading groups or clearing firms that want to access short share liquidity while offering their clients the ability to sell unused or unwanted locates and maximizing open short orders/positions to located shares. The herein disclosed interface provides the investor with significant advantages over existing systems by providing the investor with the ability to track availability, prices for multiple symbols simultaneously, in a dynamically updating fashion. Those fields that are normally synonymous with equity quotation pricing, such as open price, day high, day low, last price are all similarly herein viewable, and shown on a single screen, simultaneous with the ability to enter in a requested # of shares and then Buy. For any located shares that are not in use, a Credit button will automatically appear. Providing investors with a way in which to potentially recoup some of the cost that was used to initially purchase the locate is another tremendous advantage that investors do not have on existing locate platforms. The interface will allow investors to provide bids for buying share locates. These can be filled from either outside vendors or by existing locates marked for sale on the network.

Specifically, the herein disclosed computer system, GUI and network arrangement is directed towards creating a means by which investors can buy locates through their broker dealer from outside vendors and other participants of the network and "sell" stock locates to other participants on the same trading day. The graphical user interface is provided to the investor with dynamic information related to the current pricing, availability and an order entry on stock locates. The order entry includes both the ability to buy and to sell. Described herein is also a method and system for placing the buy and sell orders and the mechanics behind them. The invention utilizes and relies on a back end order book, including locate rates pulled in from all outside vendors, all internal "Sell" orders that are marked for credit, as well as all request for bids. This order book is arranged in a typical auction style price montage, although the invention goes beyond the scope of the arrangement of the order book, the utilization of a "dark pool", or any other specific method of arranging and/or transacting in the reselling, recycling or redistributing short located shares on an intraday basis.

These embodiments, and others described in greater detail hereinafter, provide the investor with a unique capability of being able to potentially "sell" unused, unable to be used, or no longer wanted to be used locates to other network participants. The graphical user interface provides investors with improved efficiency in ascertaining their ability and cost for obtaining locates and factoring that into the overall cost of shorting a stock. The interface provides for maximization of locate usage by the broker dealer participants, while demonstrating compliance. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

FIG. 2 illustrates a preferred embodiment of a graphic user interface (GUI) displayed on a plurality of computers linked in the herein disclosed network, and which includes a Locate screen portion, a Watchlist screen portion, and a Inventory/History screen portion.

FIG. 2B is an enlarged detail view of the Watchlist screen portion shown in FIG. 2.

FIG. 2D is an enlarged detail view of the Inventory/History screen portion shown in FIG. 2, shown with the History Tab being selected for viewing.

FIG. 5A shows a first step in an example illustrating the computer system and network disclosed herein for multiple intraday and interuser acquiring/discharging of short sale securities locates.

FIG. 5B shows a second step in an example illustrating the computer system and network disclosed herein for multiple intraday and interuser acquiring/discharging of short sale securities locates.

FIG. 5D shows a fourth step in an example illustrating the computer system and network disclosed herein for multiple intraday and interuser acquiring/discharging of short sale securities locates.

FIG. 5E shows a fifth step in an example illustrating the computer system and network disclosed herein for multiple intraday and interuser acquiring/discharging of short sale securities locates.

FIG. 5F shows a sixth step in an example illustrating the computer system and network disclosed herein for multiple intraday and interuser acquiring/discharging of short sale securities locates.

FIG. 5 shows a seventh step in an example illustrating the computer system and network disclosed herein for multiple intraday and interuser acquiring/discharging of short sale securities locates.

FIG. 5H shows a eighth step in an example illustrating the computer system and network disclosed herein for multiple intraday and interuser acquiring/discharging of short sale securities locates.

FIG. 5I shows a ninth step in an example illustrating the computer system and network disclosed herein for multiple intraday and interuser acquiring/discharging of short sale securities locates.

FIG. 5J shows a tenth step in an example illustrating the computer system and network disclosed herein for multiple intraday and interuser acquiring/discharging of short sale securities locates.

FIG. 5K shows a eleventh step in an example illustrating the computer system and network disclosed herein for multiple intraday and interuser acquiring/discharging of short sale securities locates.

FIG. 5L shows a twelfth step in an example illustrating the computer system and network disclosed herein for multiple intraday and interuser acquiring/discharging of short sale securities locates.

FIG. 5M shows a twelfth step in an example illustrating the computer system and network disclosed herein for multiple intraday and interuser acquiring/discharging of short sale securities locates.

DETAILED DESCRIPTION OF THE PREFERRED EMBODIMENTS

As described with reference to the accompanying figures, the herein disclosed computer system and network (see FIG. 1) provides a GUI display screen 101 (see FIG. 2) and back end processing for current stock locates prices, the ability for investors, suppliers, and vendors to connect to a centralized location for the purpose of providing, distributing, and interchanging stock locates throughout the trading day. In addition, the ability to secure stock locates and the ability to potentially sell any previously secured locates to another investor on the network that same day. Both the display of information laid out on a single screen and the ability to be able to interact with stock locates in an auction type of marketplace provides the investor with a significant advantage when trading the market on the short side. Investors can instantly know whether a list of stocks are able to be shorted for free, with a fee, what the rate is to locate shares intraday, the estimated overnight rate to hold the shares shorts, the ability to secure a locate, as well as the ability to sell any locate inventory, adding to their competitive advantage and increases the likelihood that the fees paid for locates will be minimized, and thus add to their bottom line.

Figure 1:
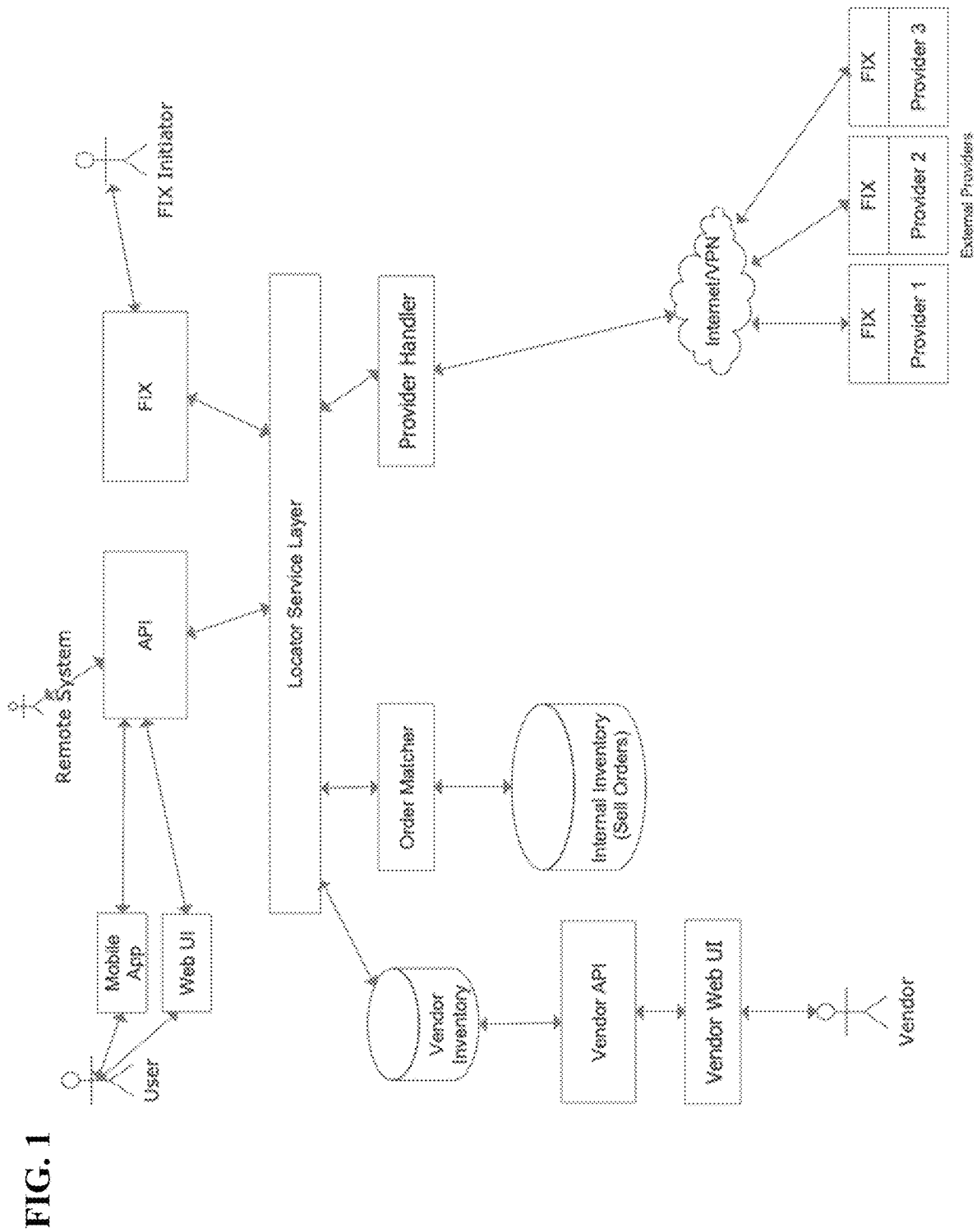
FIG. 1 is a flow chart illustrating a computer network that facilitates the process of an electronic investor using the herein disclosed GUI to buy and sell locates intraday for shorting equities.

As seen in FIG. 1, in the preferred embodiment, the investor/trader may access the GUI 101 on a computer or electronic terminal that is coupled to the network. The computer can communicate directly or indirectly with the network to receive and transmit pricing, order and inventory data on stock locates. It is able to interact with an investors, suppliers, vendors and broker dealers either directly or indirectly to allow interaction with locates within the network by facilitating either the buying or selling of stock locates within the network, while also keeping a historical record and audit trail of all stages of all locate orders and fills. It is envisioned that the system and GUI can be implemented on any existing or future terminal or device with the processing capability to perform the functions described herein. The scope of the present invention is not limited by the type of terminal or device used.

Figure 2:
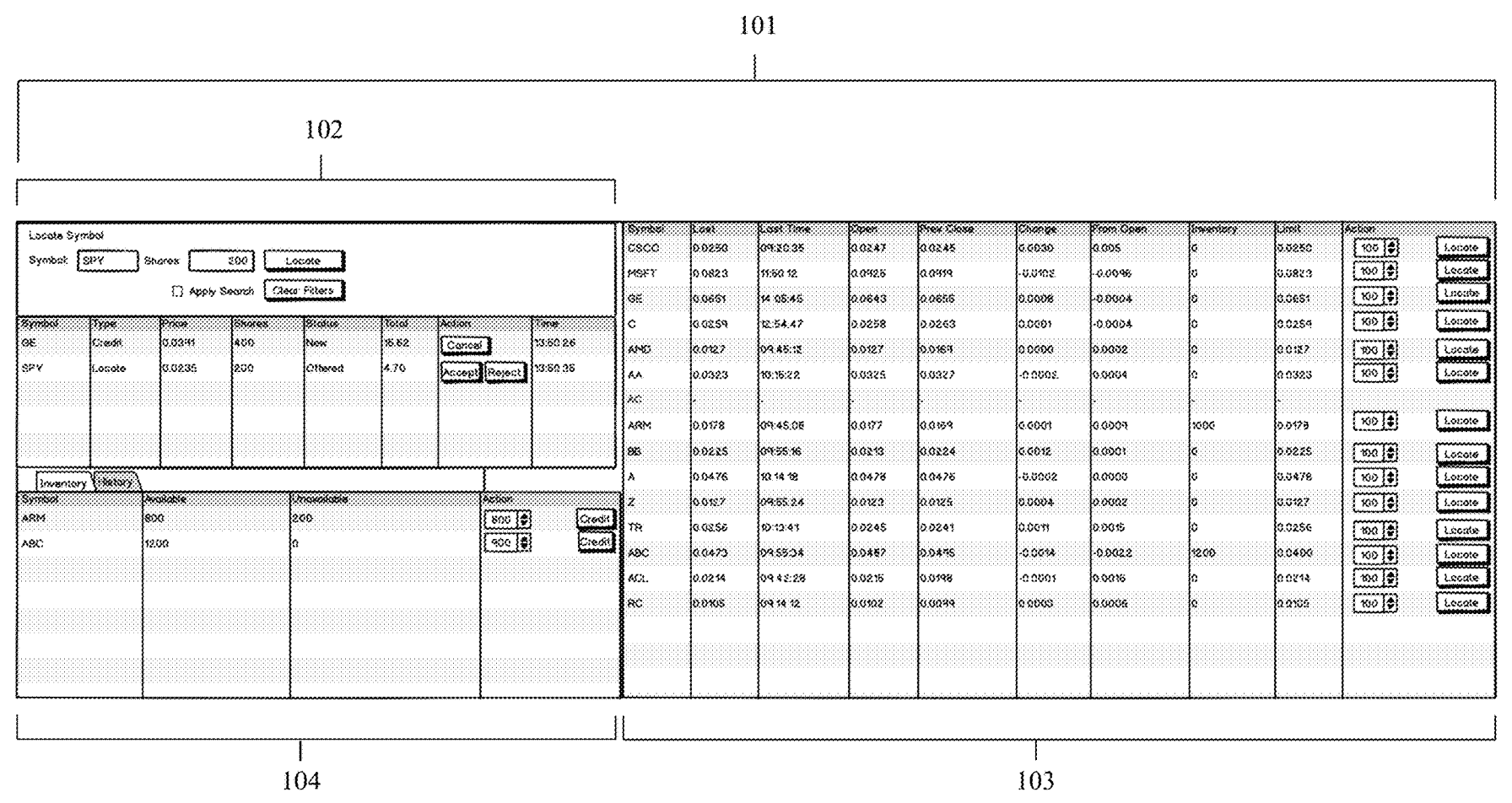
Figure 2A:
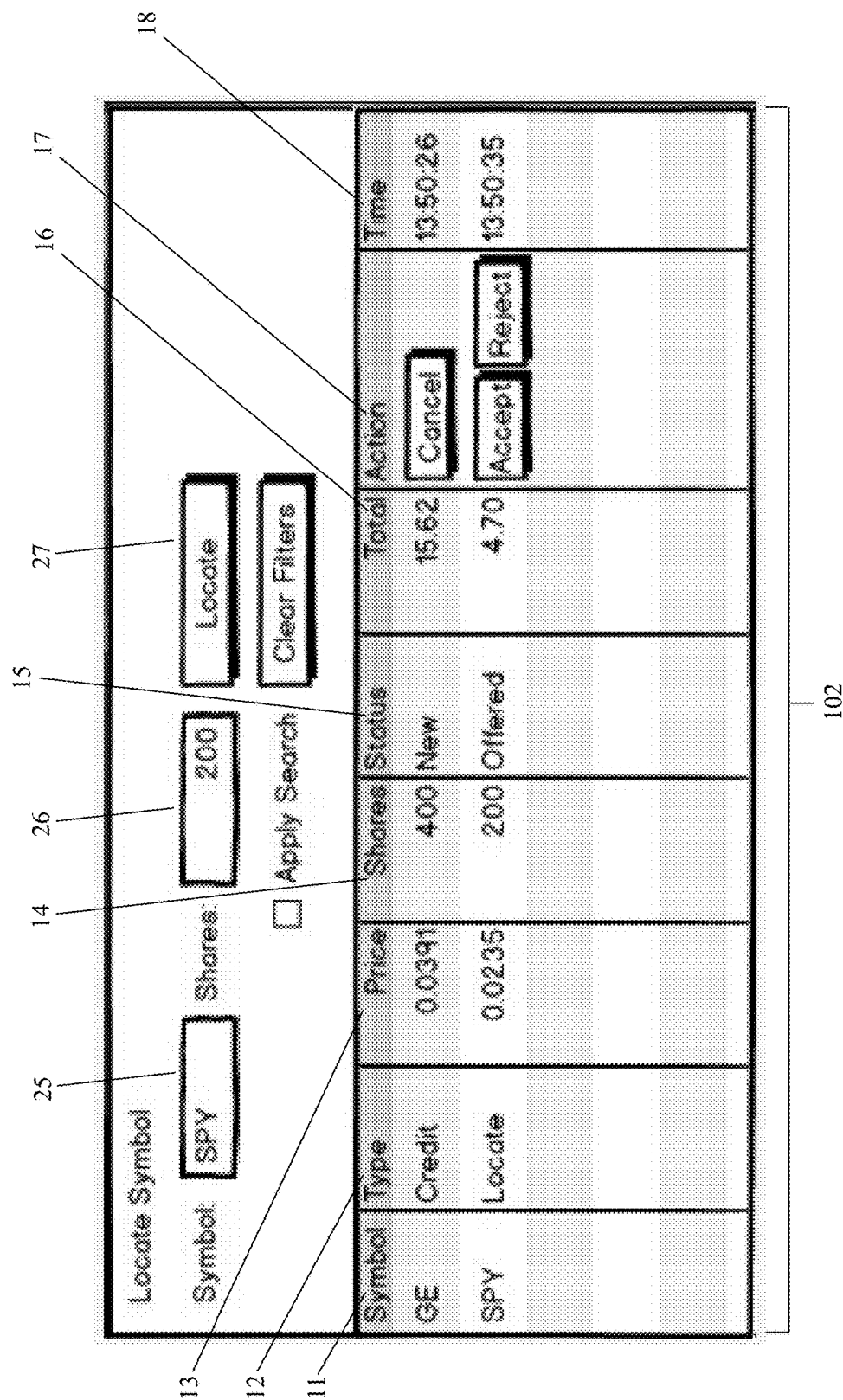
FIG. 2A is an enlarged detail view of the Locate screen portion shown in FIG. 2.
Figure 2C:
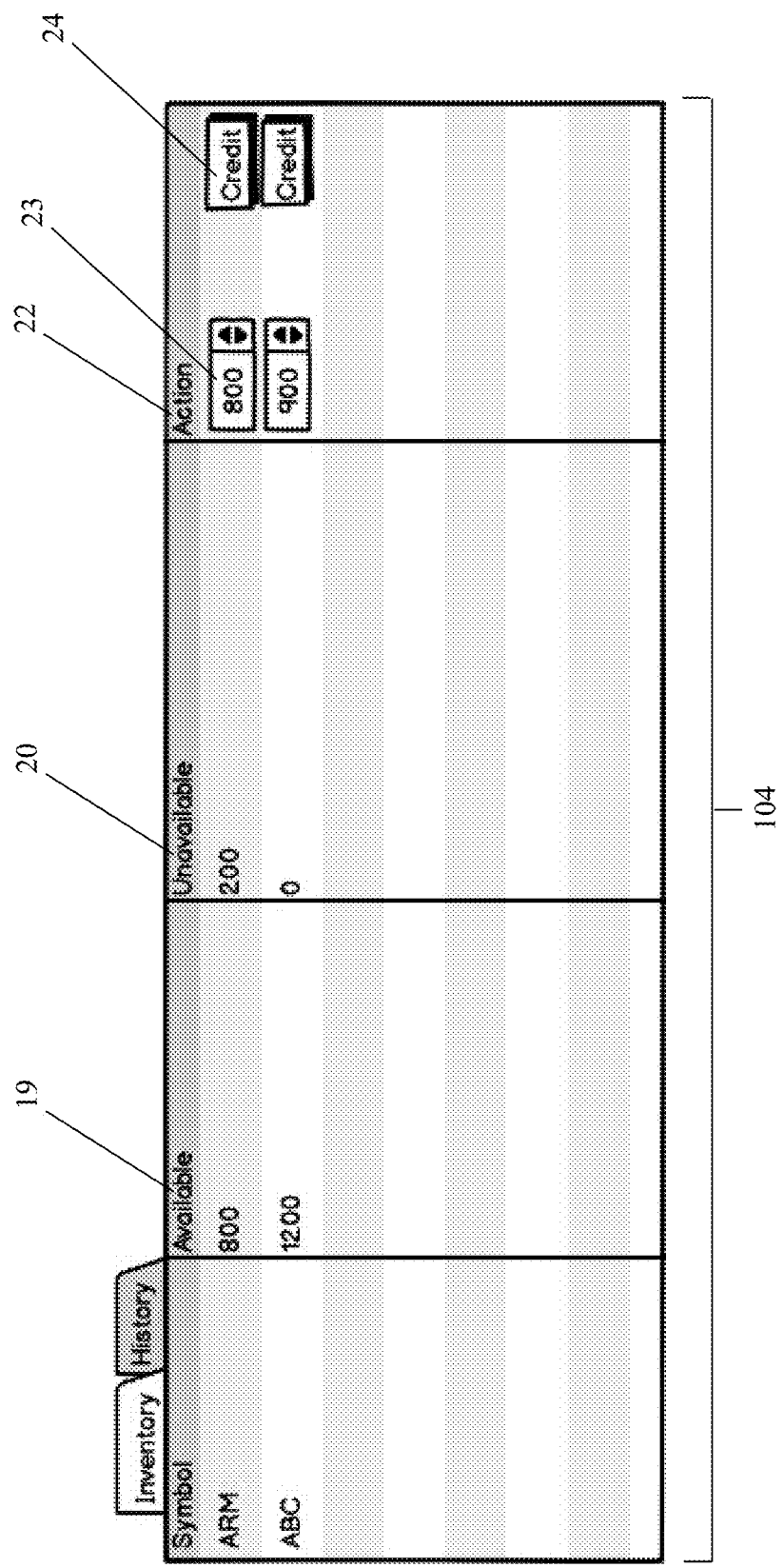
FIG. 2C is an enlarged detail view of the Inventory/History screen portion shown in FIG. 2, shown with the Inventory Tab being selected for viewing.
Figure 3:
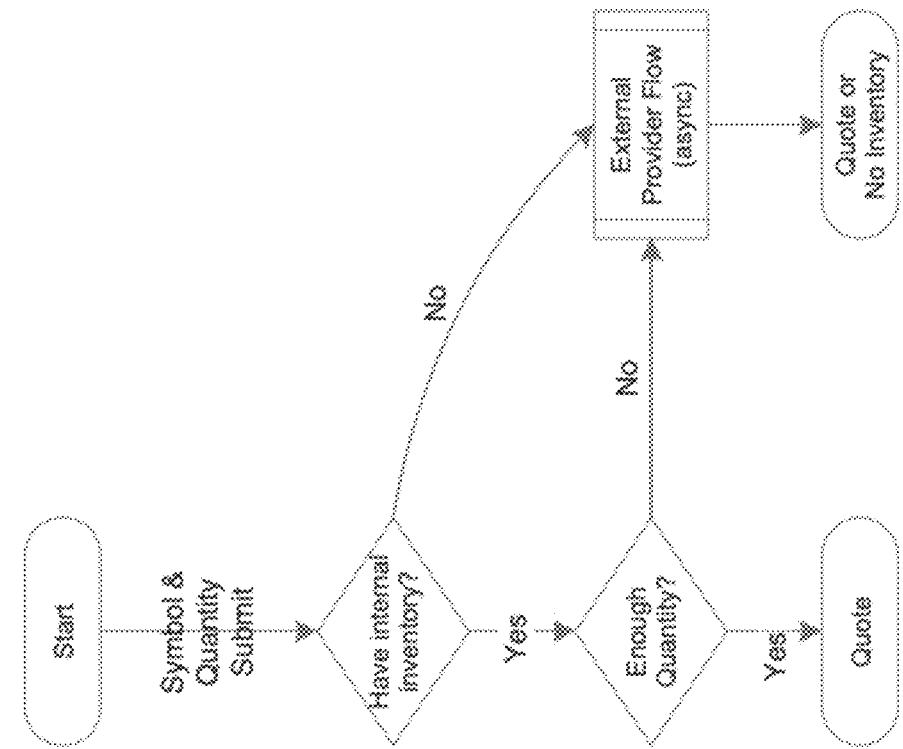
FIG. 3 is a flow chart identifying the quote flow portion of the process of an electronic investor using the herein disclosed GUI and network system to buy and "sell" locates intraday for shorting equities.
Figure 4:
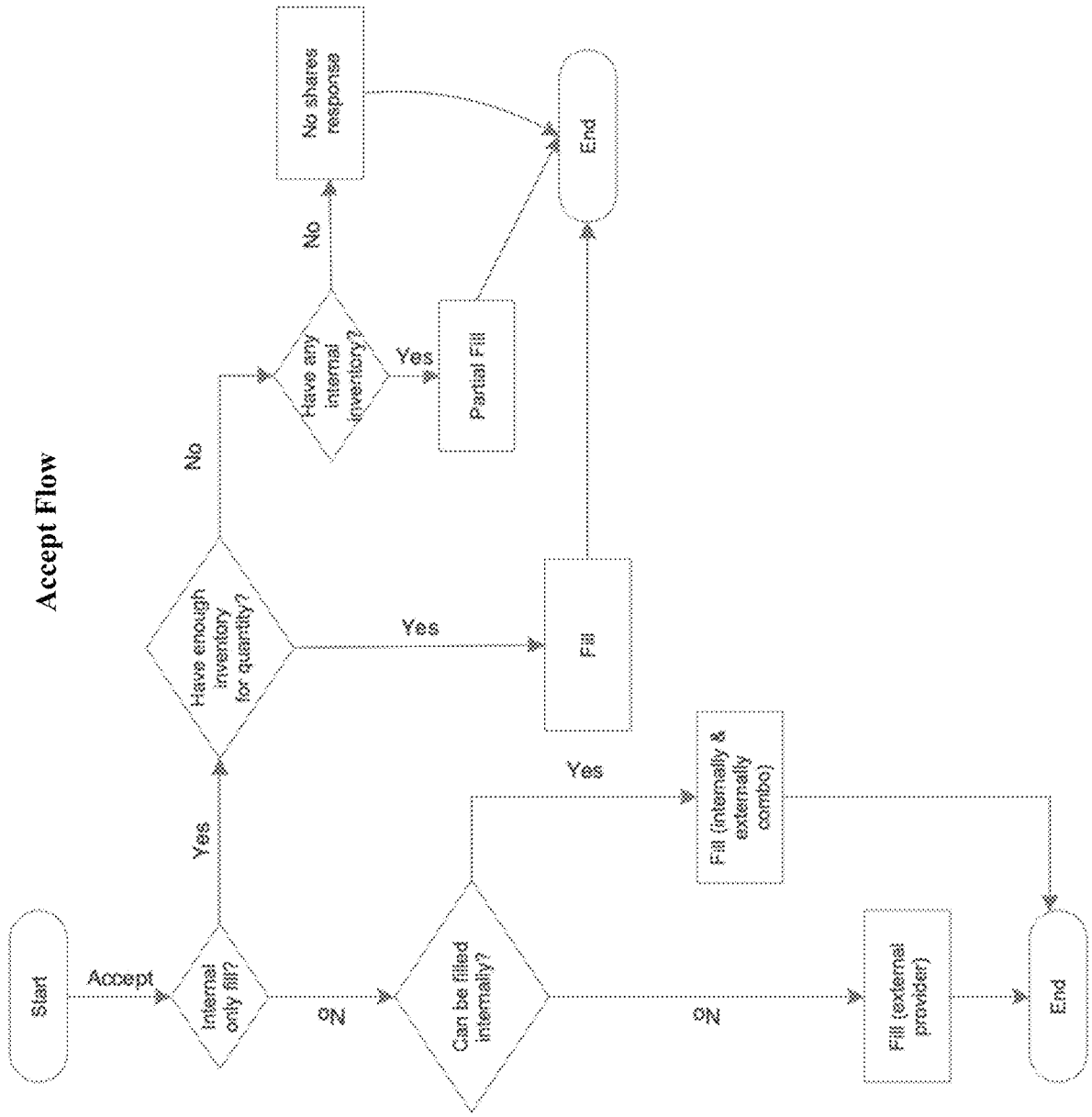
FIG. 4 is a flow chart identifying the accept flow portion of the process of an electronic investor using the herein disclosed GUI and network system to buy and "sell" locates intraday for shorting equities.

In the preferred embodiment the network may be accessed via the main graphical user interface 101 shown in FIG. 2, which is organized to provide the investor with all relevant information related to stock locates both for that trading day and historically, all on one screen. All on one screen refers to the fact that all information is accessible from one screen, not necessarily always presented simultaneously on one screen (e.g., see FIG. 2A, FIG. 2B, and FIG. 2C). While having all information shown simultaneously on one screen as seen in FIG. 2 is the preferred mode of presentation, the scope of the present invention is not limited to displaying all information on one screen simultaneously, but rather that it is accessible from one screen. Thus, the scope of this GUI 101 is not limited to any number of windows, more than less than or equal to three windows, or any information contained in these three windows, despite the preferred embodiment being shown herein as having three windows.

The graphical user interface (GUI) 101 shown in FIG. 2 includes, but is not limited to, a Pending Locate screen 102 (see FIG. 2A), a Watchlist screen 103 (see FIG. 2B), and an Inventory-History screen 104 (FIG. 2C and FIG. 2D).

The Watchlist screen 103 allows the investor to enter in the symbol column 1 of each of FIG. 2 and FIG. 2B as many stock symbols as desired (e.g., "CSCO" for Cisco Systems, Inc.; MSFT for Microsoft Corp.; . . . ; RC for Ready Capital Corp.; etc.), for which locate availability and price tracking will occur. The GUI may therefore populate a matrix of information, including other headings to the right of the "Symbol" heading to form a plurality of other columns related to the entered stock symbol, along with values in each of those other columns associated with the symbol. The other parameter headings to the right of the "Symbol" heading in the Watchlist screen 103 includes, but is not limited to, the—

"Last" heading 2—the value(s) in this column is the Last located price. The "Last" Price for the CSCO symbol is 0.0250, which means that the last time CSCO was located, 0.025 dollars per share was the rate paid;

"Last Time" heading 3—the value(s) in this column is the time that the symbol was last located. The "Last Time" that a CSCO stock locate was located by a user was on 09:20:35 which means that the last time that CSCO was located on the network was at 9:20 and 35 seconds a.m., EST.;

"Open" heading 4—the value(s) in this column is the first rate that the symbol was located for on the day. The opening rate (i.e., first rate) of the day for the CSCO locate was 0.0247, meaning CSCO was located for 0.0247 per share the first time that it was located on the day;

"PrevClose" heading 5—the value(s) in this column is the rate of the last locate from the previous day. The rate of the last locate on the previous day for CSCO is 0.0245, meaning the rate that CSCO was last located for on the prior day was 0.0245 dollars per share;

"Change" heading 6—the value(s) in this column is the change in current rate from previous day's close. The change in current rate of CSCO from the previous day's close is shown in a green color as 0.0003. This means that the current locate rate for CSCO is 0.0003 per share greater than when it was initially located on the current day.

"From Open" heading 7—the value(s) in this column is the change in current rate from the opening rate. The change in current rate from the day's opening rate is shown in a green color as 0.0005. This means that the current locate rate for CSCO is 0.0005 per share greater than it was when it was last located on the previous day.

"Inventory" heading 8—the value(s) in this column is the total quantity of shares in the investor's inventory, which is the sum of available and unavailable shares. This user currently has a total of 0 shares of CSCO in their inventory.

"Limit" heading 9—the value(s) in this column is the price at which a locate is bought or "sold" at. The modifiable limit price is 0.0250 for symbol CSCO. If the locate button is pressed, the user will send an order for locate 100 locate shares of CSCO at a rate of 0.0250. The current rate on CSCO is 0.0250 per share, meaning that if locate is pressed, this would be a pending order that may or may not be filled due to its availability based on current network activity.

Locate Share Quantity box 10A—the value(s) in this box is the modifiable number of share locates that the user is seeking to acquire, which may default to be 100 shares.

"Locate" button 10—A button that when pressed will initiate a locate order request for the corresponding symbol, and the requested shares and rate. If the locate button is pressed for CSCO, a request is submitted to the network for 100 share locates of CSCO at 0.025 per share.

The GUI of the Watchlist screen 103 will provide the investor with the current status of the symbol as either easy to borrow or requires a locate. If it is easy to borrow it shows up in a bold green (e.g., the stock symbol for Air Canada, "AC"). If a locate is required, and there is inventory for the locate, the current rate for the locate will be displayed, otherwise no rate would be shown if there is no available inventory.

The price information is also color coded whereby green represents a number that is higher from its last update and red represents a lower number from its last update. The change in price from the Previous day's close and the change in price from today's initial price fields are also both color coded and shown with either a preceding + or − sign. Numbers that are positive represent a higher current locate rate than either yesterdays close or today's open and are shown with a preceding + sign in green, and a lower current rate are shown in red with a preceding minus sign.

The Watchlist window 103 also allows the user to see what the total cost would be to locate that number of shares of any entered stock symbol, and then may also be used to obtain the locate for that specified number of shares. To secure a locate, the user must specify a number of shares using the up down arrows next to the Locate button 10 (where 100 shares may be the default number of shares for each symbol), and must specify/enter a bid price using the Limit Price field 9 or accept the default/published price already shown therein, and then press the Locate button 10 that corresponds to the desired stock symbol. Once the locate has been secured the locate shares will be indicated in the "Inventory" column (e.g., 1000 locate shares for the stock symbol ARM, and 1200 the stock symbol ABC in FIGS. 2 and 2B), the investor can then send out a short order for up to that corresponding number of shares using a separate interface. These orders will fill or not depending on network activity from other participants and/or vendors or broker dealer participants willing to sell the locates at that bid price.

The Inventory-History window 104 (FIG. 2 and FIG. 2C) includes an Inventory tab and a History tab.

The "Inventory" tab of the Inventory-History window 104 displays to the user all current long locate positions (i.e., it shows the symbols for the obtained locate shares that are listed in the "Inventory" column of the Watchlist Window—ARM, and ABC), and in addition has other parameter headings to the right of the "Symbol" heading that includes, but is not limited to, the—

"Available" heading 19—the value(s) in this column are the quantity of shares available for placing short orders. For the ARM stock symbol there are "800" share locates available for placing short orders or that can be sold.

"Unavailable" heading 20—the value(s) in this column indicate the quantity of located shares that are already in use. This includes any open short orders, existing short positions, or any pending credits.

"Action" heading 22—which identifies the option where the investor can sell locate shares in the inventory, and when that is possible, a locate share quantity input box 23 and a Credit Button 24 appear when the user is able to "sell" a locate.

In summary, the "Inventory" tab of the Inventory-History window 104 shows the price paid, the number of shares located, the number of shares that are available to either be used for new short orders or to be sold, the number of shares that are unavailable which includes those shares that are currently being used in a short position or for opening a new short order.

The "Inventory" tab of the Inventory-History window 104 also provides for the ability to "sell" locates that have been previously purchased, and which may be sold in the same trading day that they were secured. Users can specify any number of locate shares to "sell" up to the available amount of locate shares for credit, by using the up and down arrows next to the Credit button 22, and/or can specify a price in the Limit Price field 9, and then press the Credit button 22. This order will execute based on demand on the long side for locates in this symbol from other network participants (i.e., when there is a buyer for the locate shares offered for sale). Once a locate has been marked for credit by the press of the Credit button 22, those shares then become unavailable to be used to cover an opening short order. Any locates that are currently being used to cover open short orders or short positions are unavailable to be "sold" or marked for credit. This ensures compliance with regulation SHO, ensuring that a locate is in place before an investor places an opening short order on any stock that requires a locate. This feature alone provides investors with a significant advantage over current existing abilities, as once the investor buys the locate(s), and after then having the corresponding stock shorted and after closing that short position, he/she now has a mechanism for recouping some, all, or even more than the original cost of those locate fees, which represents a tremendous potential savings in fees for making such short investments. In addition, while the scope of this disclosure is not limited to this preferred embodiment, the way and manner in which all relevant locate information is displayed on one screen provides a further advantage to the investor that is speculating the market on the short side. The GUI 101 provides broker dealer participants with a competitive advantage by enabling them to offer the ability for their clients to participate on the network and thus giving them the ability to offer the locate credit service, while participating in a larger pool of participants, and thus liquidity of locates, than they would enjoy as a standalone firm.

The History tab of the Inventory History window 104 (FIG. 2C) includes, but is not limited to, display of the historical order and fill information for all locate orders for that day, and any day in the past. In the preferred embodiment, the information displayed includes the symbol, number of shares, order price, the date/time of the order, date/time of the execution, the type of locate (intraday or available for overnight use) and the total amount actually or potentially spent or collected. The readily available nature of all inventory and locate order history provides the user with an advantage as it saves time and effort to view all locate inventory and history on one screen.

The layout and positioning of the windows in the preferred embodiment of GUI 101 create an advantage to the trader. The Watchlist window 103, attached to the right side of both the Pending Locate Window 102 and Inventory/History window 104 allows for many symbols to be inserted and viewable, potentially utilizing the users entire display from top to bottom, in the same way that a traditional stock quote Watchlist is arranged and organized. This allows for users to intuitively pick up and operate the locate network interface.

In the Pending Locate Window 102, all open, unfilled locate orders and their corresponding information is displayed. The Pending Locate Window 102 is divided into an upper window portion and a lower window portion. The lower window portion in FIG. 2A shows the stock symbols GE and SPY beneath the symbol heading 11, which symbols listed therein are only for those locate orders that are pending. Incomplete locates will also appear here. The lower window portion of the Pending Locate Window 102 also has other parameter headings to the right of the "Symbol" heading 11 that includes, but is not limited to, the—

"Type" heading 12—this column indicates the type of pending transaction, being either: Locate/Intraday or Locate/Credit. The "Credit" type for the GE symbol means that the order is to "sell" a locate. The "Locate" type in this Pending Locate Window 102 indicates that there is also an offered locate of 200 SPY locate shares;

"Price" heading 13—the values in this column are for the Price of the pending credit or locate. This user is requesting a "Credit" (i.e., a sale) of GE locate shares for 0.0391 dollars per share;

"Shares" heading 14—the values in this column indicate the locate share quantity of the pending locate or credit. There are 400 shares of GE open on this user's credit request;

"Status" heading 15—this column indicates the statutes of the pending locate order. The "New" status means that this order is not yet filled. Other statuses can be "filled", "canceled", or "partially filled";

"Total" heading 16—the values in this column indicate total S amount to be paid or collected if the locate order is filled. A total amount of 15.62 is to be paid if the 400 locate share order of GE is completely filled, and the locate seller would collect the $15.62;

"Action" heading 17—the buttons beneath this heading for each symbol are either "Cancel" or "Accept" and "Reject" If this investor/seller of the GE locate shares decides to retract the offer to sell, and presses the Cancel button, the 400 locate share sell order of GE would be immediately canceled. This investor may also either click the "Accept" button to accept the offer for the SPY locate shares or press the "reject" button to decline the offer, and "Time" heading 18—Shows the time the order was placed or locate was offered. For the GE locate shares, the order was placed at 1:50, 26 seconds, PM EST.

The upper portion of the Pending Locate Window 102 includes a stock symbol entry box 25, a share quantity entry box 26, and a drop down options menu list 27, which may be used for the investor to request or sell locate shares. As shown in FIG. 2A, this investor has entered the symbol SPY in the symbol entry box 26, and has entered the quantity of "200" in the share quantity entry box 26, and had selected the "Locate" option using the dropdown menu, resulting in the offer in the bottom half of the window of the locate shares at a rate of 0.0235 dollars per share. After the order is posted below, the symbol and the share quantity in the upper half of the window may disappear.

The information displayed in the Pending Locate Window 102 therefore includes, but is not limited to, the symbol, the number of shares, the desired price, the time that the order was placed as well as the ability to cancel any open orders. All open credit orders take away the corresponding number of shares for open short orders placed after the credit order. For a new open short order to be placed while there is an open "sell" order for the required locate, that "sell" order would first need to be canceled before the opening short order can be placed. This window provides the investor with the advantage of speed and savings of time by providing the ability to see and manage on one screen all open and pending locate orders.

To illustrate this process, an example is shown in FIGS. 5A-5M.

Figure 5A:
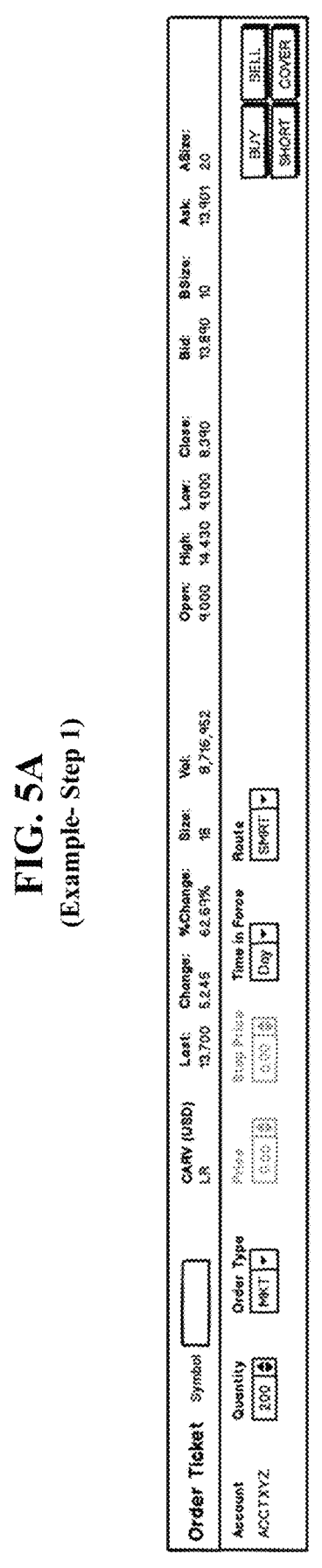
Figure 5C:
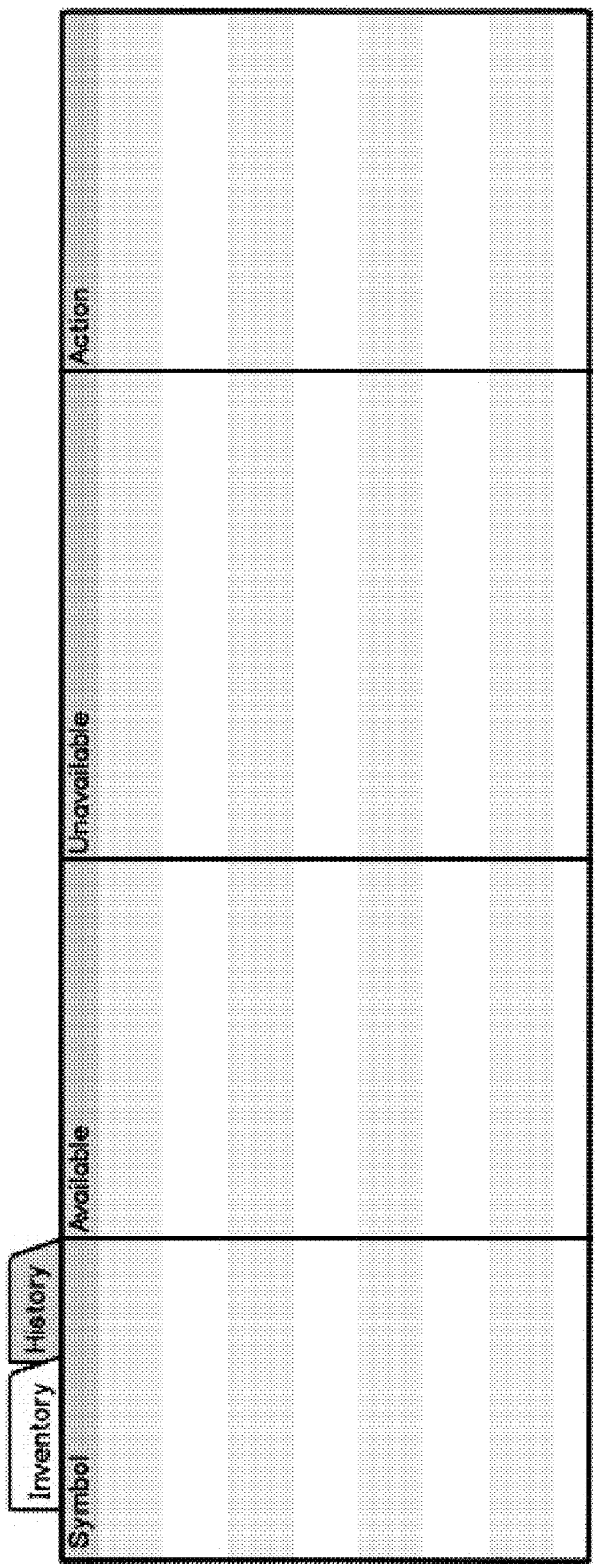
FIG. 5C shows a third step in an example illustrating the computer system and network disclosed herein for multiple intraday and interuser acquiring/discharging of short sale securities locates.
Figure 5E:
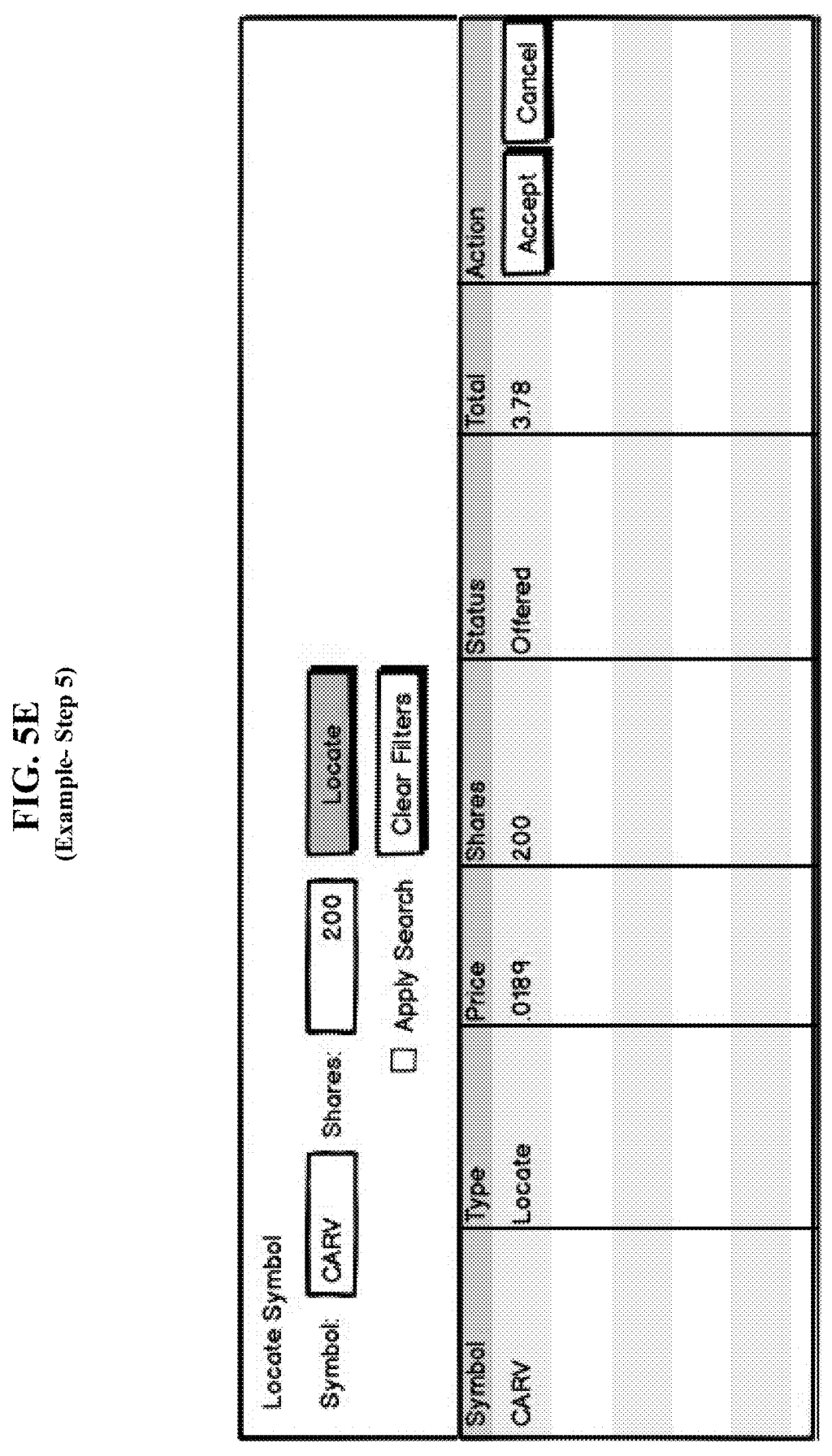
Figure 5H:
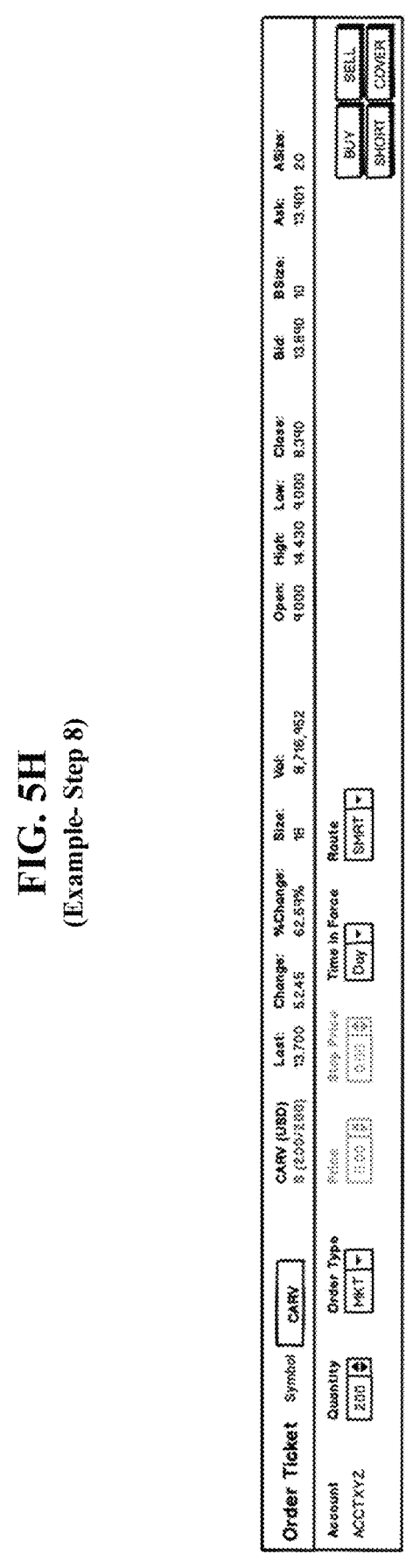
Figure 5K:
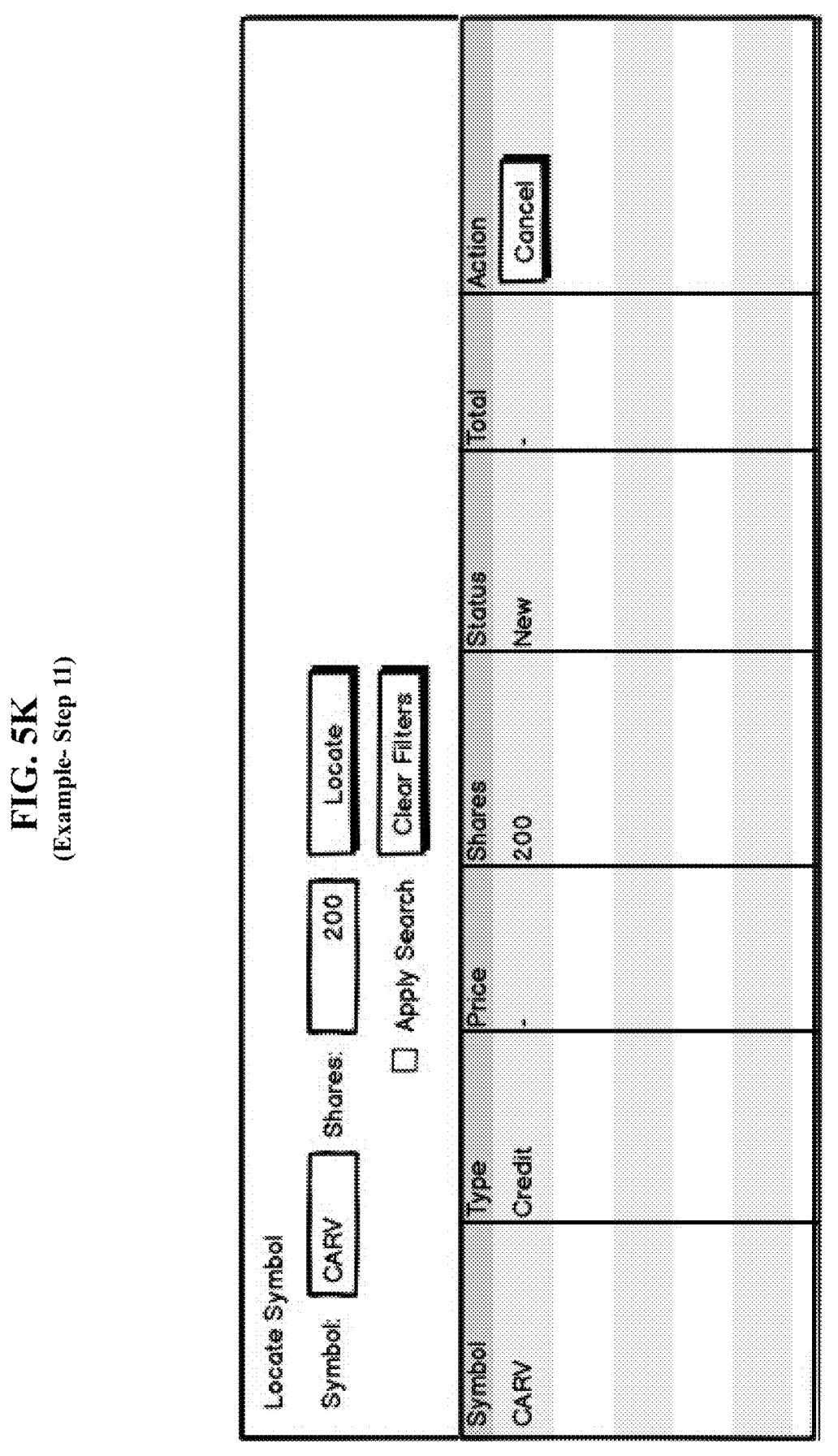

In Step 1 shown in FIG. 5A, an order entry screen is shown in which the symbol CARV for Carver Bancorp, Inc. had been entered in the symbol box shown therein. The letters "LR" may be shown in red to denote the fact that the stock cannot be shorted at this time and that a Locate is Required (LR). In Step 2, shown in FIG. 5B, the watch list screen is shown, and the trader would use this window to create a list of symbols that would potentially be shorted on the current trading day. The symbols are entered into the grid under the Symbol column header. As each symbol is entered a corresponding locate price is shown. The trader can increment the number of shares and then press the locate button to submit the locate request. In FIG. 5B for this investor, symbol CARV was entered in and the locate price of 0.0189 per share is returned. FIG. 5B also shows the investor having typed the symbol IBM into the symbol column, and after hitting the enter button, the other data fields would be filled, and IBM would be listed therein sequentially. If the investor desires to locate 200 shares of CARV in order to short the stock, he/she may toggle the arrow up button beneath the "ACTION" column in the CARV row, until the number is changed to 200 (note the default may be "100" shares). FIG. 5C shows in Step 3 that the trader currently has no locate inventory. However, upon pressing the Locate button in FIG. 5B for the 200 shares of CARV, the Pending Locate screen may be displayed, as seen in FIG. 5D for Step 4, which shows the Locate request for 200 shares of CARV. After the investor toggles the "Locate" button in FIG. 5D, the current Locate data may be displayed below, being shown as Step 5 in FIG. 5E as a pending request for a locate of 200 shares of CARV, along with "ACCEPT" and "REJECT" buttons that may be toggled to provide the ability for the trader to either accept or reject the locate request. The investor is shown toggling the "ACCEPT" button in Step 6, shown in FIG. 5F. Upon accepting the request by clicking the Accept button in Step 6, the trader has the fee of $3.78 decremented from their account, and the located shares will appear in the inventory tab as shown in Step 7, in the Inventory screen of FIG. 5G. The shares are listed in inventory as available. The trader can also now initiate a short order for up to the 200 shares located, as shown in FIG. 5H as Step 8. In this order entry window shown in FIG. 5H, the trader has typed in an order set to short 200 shares of CARV stock at the market. The letter "S" shown in this window may be green colored and represents the fact that the stock can now be shorted, and that there are currently 200 shares located and available. The trader may initiate the short order by toggling the "short button," after which the short position may be listed therein, and when the trader wishes to terminate that short position, he/she may toggle the "cover" button shown in FIG. 5H. While the trader maintains the short position, the shares will be listed as unavailable," as shown in FIG. 5I as step 9. When the trader no longer needs the located shares (i.e., when the trader has covered/terminated the short position), the Inventory screen will list the shares as "Available," and the investor will have the ability to sell any amount of the available located shares by selecting the number of shares using the arrow buttons and then clicking the Credit button each of which now appear in the Inventory screen, as shown in FIG. 5J as Step 9. Upon doing this, the amount of Available shares is decremented by the amount of shares being sold (i.e., 200 shares would again be shown as unavailable, as in FIG. 5I), and a pending locate sell order is reflected in Pending Locate window, as shown in Step 11.

Figure 5L:
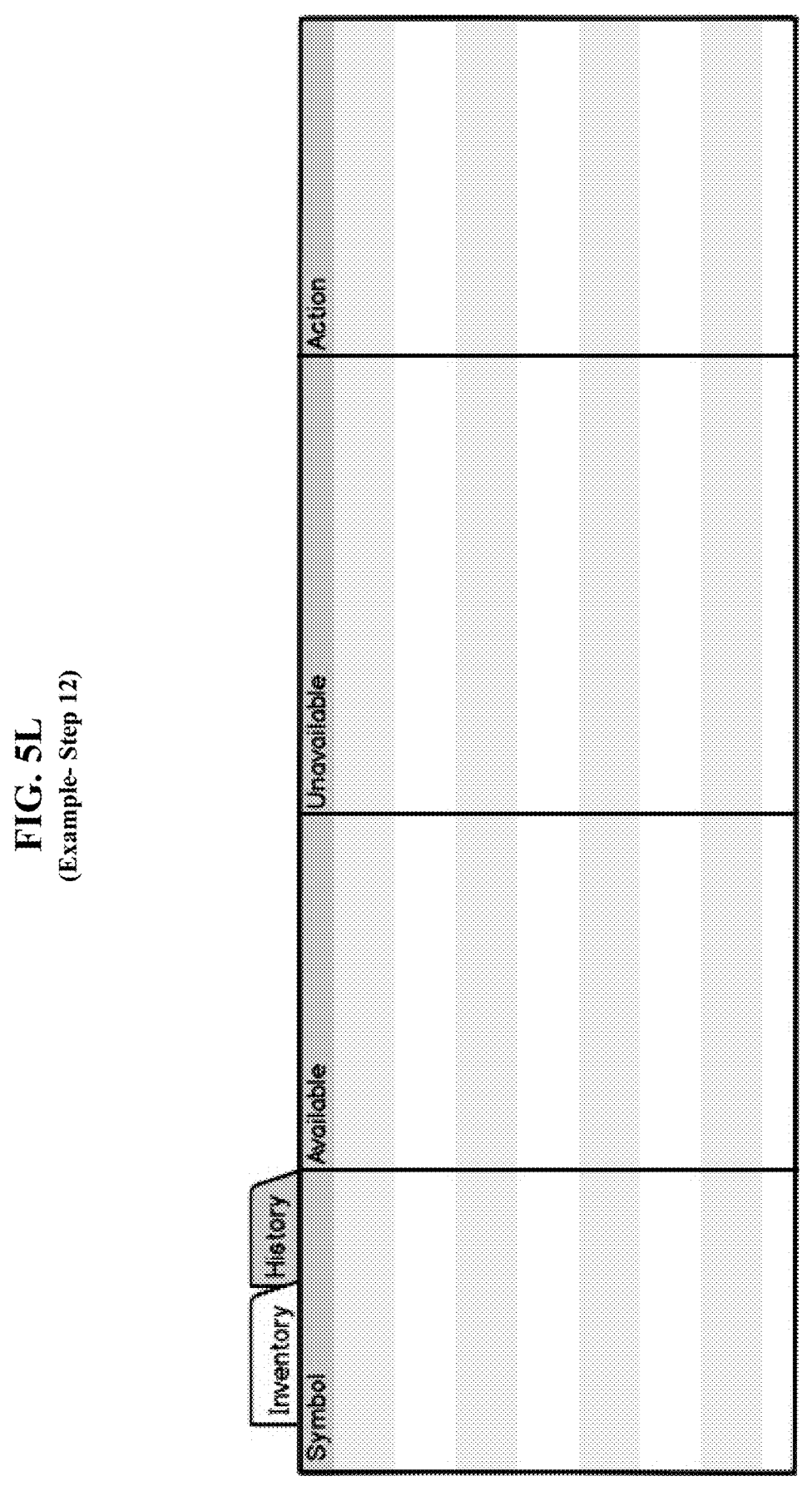
Figure 5M:
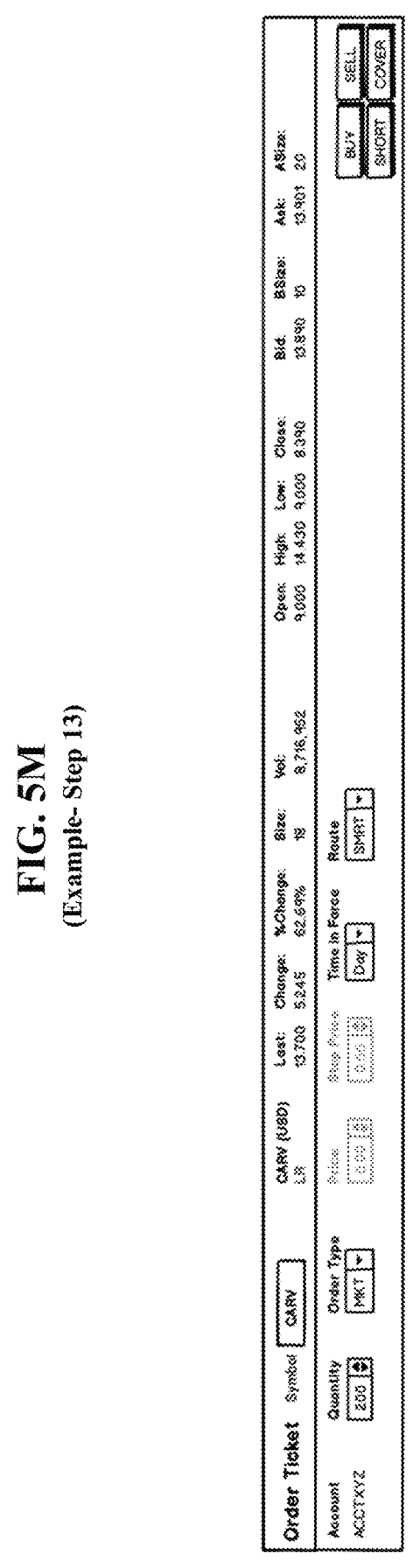

The trader can choose to Cancel that locate sell order at any time before it is sold to another investor by clicking cancel. The Sell order will fill when another trader chooses to locate that same symbol. Upon the sell order being filled, the locate inventory for that symbol would reduce by the amount of located shares sold, and the trader would be credited for the amount sold. Step 12 in FIG. 5L shows that that there is no inventory of the CARV in the Inventory Screen, and Step 13 in FIG. 5M shows the symbol CARV is once again not Shortable, and if a short is desired, another Locate is Required (LR).

Locate Network Backend Functionality

As referenced above, the present invention pertains to not only the front end of the network not limited to the preferred embodiment, but also the back end of the network that is may or may not be displayed to investors. This is the part that allows for connectivity to the network, the processing of orders and the logging of all transactions on the Blockchain or similar architecture to provide a historical audit trail and chain of custody to the millisecond for each locate share from genesis of the share on the network until the close of the trading day. This audit trail is immutable and can be used to demonstrate compliance of Regulation SHO.

Locate Acquisition Workflow

An actor (Investor, user, or broker) makes a locate request for a specified quantity of shares of a particular equity (i.e. 500 SPY). The system (the section of the network that processes locate order information) will determine a price considering all available sources the network has, including, but not limited to: internal inventory, vendor inventory and external providers, and to respond with either a price, or a response of no locate share availability. The actor can then either accept the offer, reject the offer, or wait for the offer to expire. Should the offer be accepted, the system will attempt to fill the acceptance. Between the offered time and the accepted time, supply is dynamically changing, so the response will be a fill, partial fill, or no shares available, depending on demand.

Locate Credit

An actor can put in a request for a locate credit. The request will be filled at some user defined or network derived rate. Once the credit request is initiated for available locate shares, the shares within that credit request are no longer available for use by that account for either opening short orders or newly opened short positions, in accordance with Reg SHO. The open locate credit request will remain pending, until filled, or is canceled by request. Once the credit request is filled, the ownership is transferred via the network to another network participant, and all details of the transaction, orders, acceptances, and any related and or relevant information is recorded on a Blockchain ledger.

The Order Book

A central part of the network is the network order book. The order book may be an auction style set of records that represent the stock locates rates and quantities to be bought or marked for credit at unmatching or non-overlapping buy/credit rates for each stock. The order book may or may not be exposed or shown to the end user or participants of the network. The order book may also be in the form of a dark pool where proprietary algorithm will determine the rate the credits are issued and locates are bought.

In the auction style market, the way in which the order book is arranged is in a two column format, with the left hand column representing short locate orders that are to be bought, arranged by rate in a descending order. Each "Buy" locate record at the same price is grouped together, creating a total quantity to be bought at each rate level. The right hand column is arranged in descending rate order of locates to be marked for credit. Each "sell" locate record at the same price is grouped together, creating a total quantity to be bought at each rate level.

In the preferred embodiment, buy and "sell" locate orders are kept in a dark pool and executed via network forces including but not limited to network participants, outside vendors, internal inventory and network activity.

Blockchain Ledger

The Blockchain ledger can be any Blockchain technology that provides cryptographic proof that records stored in a sequential chain between the Nth position and any position <N and >=genesis record (0) have not been modified. This is accomplished by having each block cryptographically hashed (i.e. HMAC SHA-256) and including the previous record's hash included in the signature of the current record, forming a chain of signed information. If any content of a record is modified (down to the bit), the signature will not match.

WORM Store

The WORM (Write Once Read Many) store is a remote service that provides one-way transfer of data from our network to the store. This will provide not only proof that the data wasn't modified, but also a disaster-recovery solution for the transfer of ownership ledger.

Computer System

Figure 6:
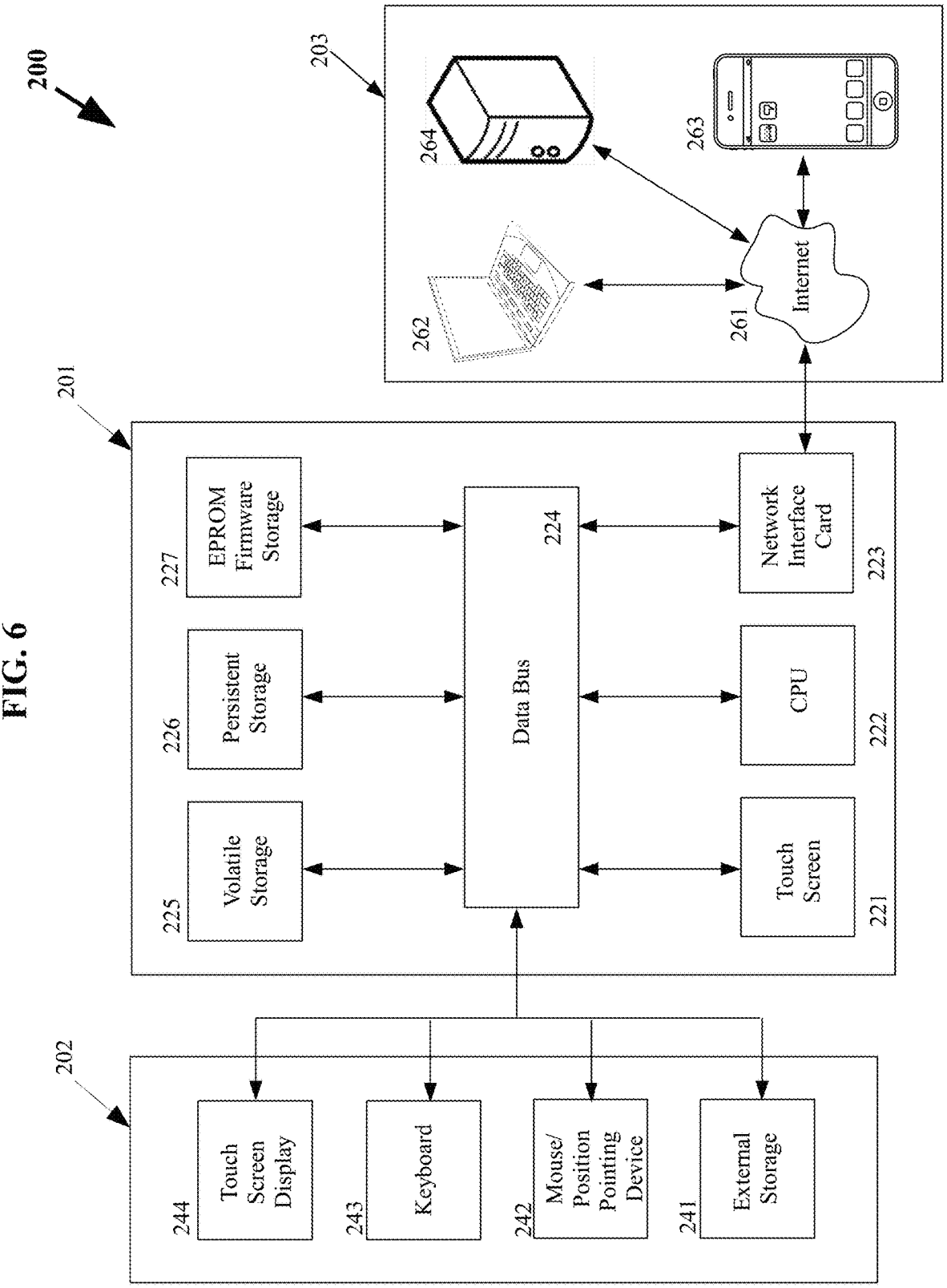
FIG. 6 is a schematic illustration showing an exemplary computing unit capable of being programmed by the instructions of the software of the present invention, and which may include personal computers, cellular phones, and other mobile computing devices.

Software to provide the herein disclosed GUI functionality may run on a suitable computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 6, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static non-transitory storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of non-transitory computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

LIST OF REFERENCE NUMERALS UTILIZED

1. Depicts the Watchlist symbol column. This is a list of stock symbols for which locate availability and price tracking is occurring. The list includes the symbols: "CSCO," Cisco Systems; "MSFT," Microsoft; "GE," General Electric; "C," Citigroup; etc.
2. Last Price Column—Last located price. The "Last Price" for the CSCO symbol is 0.0250, which means that the last time CSCO was located, 0.025 dollars per share was the rate paid.
3. Last Time column—The time that the symbol was last located. The "Last Time" that a CSCO stock locate was located by a user was on 09:20:35 which means that the last time that CSCO was located on the network was at 9:20 and 35 seconds a.m., EST.
4. Open—The first rate that the symbol was located for on the day. The opening rate (i.e., first rate) of the day for the CSCO locate was 0.0247, meaning CSCO was located for 0.0247 per share the first time that it was located on the day.
5. PrevClose—The rate of the last locate from the previous day. The rate of the last locate on the previous day for CSCO is 0.0245, meaning the rate that CSCO was last located for on the prior day was 0.0245 per share.
6. Change—change in current rate from previous day's close. The change in current rate of CSCO from the previous day's close is shown in a green color as 0.0003. This means that the current locate rate for CSCO is 0.0003 per share greater than when it was initially located on the current day.
7. From Open—change in current rate from open. The change in current rate from the day's opening rate is shown in a green color as 0.0005. This means that the current locate rate for CSCO is 0.0005 per share greater than it was when it was last located on the previous day.
8. Inventory—total quantity of shares in your inventory, which is the sum of available and unavailable shares. This user currently has a total of 0 shares of CSCO in their inventory.
9. Limit—lists a Price at which a locate can be requested to be bought or "sold" at. The modifiable limit price is 0.0250 for symbol CSCO. If the locate button is pressed, the user will send an order to locate 100 shares of CSCO at a rate of 0.0250. The current rate on CSCO is 0.0250 per share, meaning that if locate is pressed, this would be a pending order that may or may not be filled due to its availability based on current network activity.
10A. Locate Share Quantity box—the modifiable number of share locates that the user is seeking to acquire, which may default to be 100 shares.
10. Locate button—A button that when pressed will initiate a locate order request for the corresponding symbol, and the requested shares and rate. If the locate button is pressed for CSCO, a request is submitted to the network for 100 share locates of CSCO at 0.025 per share. This request will either be filled from internal supply, filled from external vendors or returned with a no shares available if there were no longer any locate inventory across all channels for CSCO. The request to locate 100 CSCO is only registered to the network. Other investor users of the network will not see this request to locate 100 CSCO unless they were the seller of the locate.
11. Identifies the symbol column in the Pending Locate window 102—The symbols listed here are only for those locate orders that are pending. In this Pending Locate Window 102 there is an open "sell" order for 400 GE locate shares. Incomplete locates will also appear here. In this Pending Locate Window 102 and there is also an offered locate of 200 SPY locate shares at a rate of 0.0235 per share ($4.70 total).

12. Type—Locate/Intraday Locate/Credit. This indicates the type of pending transaction, and the "Credit" type for the GE symbol means that the order is to "sell" a locate.
13. Price—Price of the pending credit or locate. This user is requesting a "Credit" (i.e., a sale) of GE locate shares for 0.0391 per share.
14. Shares—Locate share quantity of pending locate or credit. There are 400 shares of GE open on this user's credit request.
15. Status—Pending locate order status. The "New" status means that this order is not yet filled. Other statuses can be "filled", "canceled", or "partially filled."
16. Total—Total $ amount to be paid or collected if the locate order is filled. A total amount of 15.62 is to be paid if the 400 locate share order of GE is completely filled, and the locate seller would collect the $15.62.
17. Action—Cancel order/Accept/Reject Offer. If the seller of the GE locate shares decides to retract the offer to sell, and presses the Cancel button, the 400 locate share sell order of GE would be immediately canceled.
18. Time—Shows the time the order was placed or locate was offered. For the GE locate shares, the order was placed at 1:50.26 seconds, PM EST.
19. Identifies the "Available" column in the Inventory-History window 104, which are the quantity of shares available for placing short orders. For the ABC stock symbol there are "1200" share locates available for placing short orders. The user has 300 intraday locates which means only 900 of these are able to be used for a credit request.
20. Unavailable—Quantity of located shares that are already in use. This includes any open short orders, existing short positions, or any pending credits.
21. Intraday locate quantity—This is the quantity of intraday locates that the user has located. These are unavailable for credit and cannot be used to secure overnight short positions.
22. Credit Button—Appears when the user is able to "sell" a locate The Credit button appears next to a corresponding symbol because this user has locate shares that can be "sold" which means they are not already marked for credit or supporting open short orders or positions.
23. Locate Share Quantity Input Box.
24. Credit Button—appears when the user is able to "sell" a locate.
25. Stock Symbol Entry Box appears in the upper portion of the Pending Locate Window.
26. Share Quantity Entry Box appears in the upper portion of the Pending Locate Window.
27. Drop Down Options Menu List—may be used for the investor to request or sell locate shares.

What is claimed is:

1. A computer-implemented method for locating one or more shares of a stock being held long by an owner willing to lend them to an investor for use in a short sale, and for acquiring and spontaneous intra-day discharging of short sale stock locates for the investor, said computer-implemented method comprising:

configuring one or more first client devices for continuously transmitting its respective available stock locates usable for the short sale and corresponding locate rates for one or more stocks symbols over a network to a server;

configuring the server for continuously monitoring said transmitted available stock locates and corresponding locate rates for the one or more stock symbols by each of the one or more first client devices;

configuring the server for hosting a graphic user interface (GUI) configured for displaying: a pending locate screen;

configuring the server for displaying, in the pending locate screen,
a stock symbol entry box,
a locate share quantity entry box,
a limit price box,
a locate button; and
an accept button;

configuring two or more investor client devices for accessing the GUI of the server, for entering of one or more stock symbols in the stock symbol entry box, for entering of a locate share quantity in the locate share quantity entry box, and for toggling the locate button;

entering, by a first investor, of a particular stock symbol in the stock symbol entry box and a desired locate share quantity in the locate share quantity entry box, and toggling by the first investor, of the locate button;

configuring the server for comparing each instance of said entered particular stock symbol to each of said transmitted available stock locates of the one or more first client devices, and configuring the server for displaying in the pending locate screen, of the first investor, an offered limit price of the particular stock symbol transmitted as available from the one or more first client devices;

toggling, by the first investor, of the accept button for accepting of the offered limit price for the desired locate share quantity for the particular stock symbol;

removing, by the server, of the accepted locate share quantity from said transmitted available stock locates;

configuring the server for displaying an inventory screen in the GUI of the first investor;

displaying, by the server, each of the following in the inventory screen of the first investor;
the accepted locate share quantity,
the particular stock symbol,
an available locate share quantity of the first investor,
a requested limit price;
an unavailable locate share quantity of the first investor,
a locate share quantity input box, and
a credit button;

entering, by the first investor, of a desired amount of the available locate share quantity in the locate share quantity input box for the particular stock symbol and entering the requested limit price;

toggling the credit button, by the first investor, for immediate intraday offering of the desired amount of the available locate share quantity;

transmitting, by the server, the offered amount of the available locate share quantity to each of the two or more investor client devices;

displaying said offered amount of the available locate share quantity and the particular stock symbol in the pending locate screen of each of the two or more investor client devices, when the particular stock symbol is entered in the respective pending locate screen;

entering, by a second investor, the particular stock symbol in the stock symbol entry box and a needed locate share quantity of the second investor in the locate share quantity entry box, and toggling, by the second investor, of the locate button;

displaying in the watchlist screen, of the second investor, the requested limit price of the particular stock symbol offered by the first investor;

toggling, by the second investor, of the accept button for accepting of the requested limit price for the needed locate share quantity for the particular stock symbol;

removing, by the server, of the needed locate share quantity from the available locate share quantity in the inventory screen of the first investor.

2. The computer-implemented method for acquiring and discharging of short sale stock locates according to claim 1, further comprising:

configuring the server for entering of a requested limit price in the limit price box of the one investor client device, and for toggling the locate button for requesting a stock locate from the one or more first client devices at the requested limit price;

configuring the server for transmitting said requested stock locate at said entered limit price to the one or more first client devices;

configuring the server for displaying a pending locate screen in the GUI of the one investor client device; and configuring the server for displaying said requested stock locate symbol, said requested share quantity, and said requested limit price in a line of the pending locate screen;

configuring the one or more first client devices for transmitting an offered limit price to the server from at least one of the one or more first client devices;

configuring the server for receiving the offered limit price from at least one of the one or more first client devices;

configuring the server for displaying said received offered limit price in the line of the pending locate screen of the one investor client device; and configuring the server for displaying an accept button and a reject button on the line of the pending locate screen of the one investor client device;

configuring the server for responding to toggling of the accept button by removing the share locate quantity from the available stock locates, and by displaying the accepted stock locate quantity in the inventory quantity box for the corresponding stock symbol displayed in the watchlist screen of the one investor client device; and configuring the server for responding to toggling of the reject button by removing said offered stock share locate from the pending locate window of the one investor client device.

3. The computer-implemented method for acquiring and discharging of short sale stock locates according to claim 1, further comprising:

configuring the server for displaying a history screen in the GUI of the one investor client device; and configuring the server for displaying the rejected offered stock share locate in the history screen.

4. The computer-implemented method for acquiring and discharging of short sale stock locates according to claim 1, wherein said watchlist screen further comprises: a last price column, said last price column configured to display a last price per share paid for each of said transmitted available stock locates.

5. The computer-implemented method for acquiring and discharging of short sale stock locates according to claim 1, wherein said watchlist screen further comprises: a last time column, said last time column configured to display a time in hours, minutes, and seconds when each of said transmitted available stock locates was last located on the network.

6. The computer-implemented method for acquiring and discharging of short sale stock locates according to claim 1, wherein said watchlist screen further comprises: an open column, said open column configured to display a rate at which each of said transmitted available stock locates was last located on the network on a same day.

7. The computer-implemented method for acquiring and discharging of short sale stock locates according to claim 1, wherein said watchlist screen further comprises: a previous close column, said previous close column configured to display a last rate of each of said transmitted available stock locates from the previous day.

8. The computer-implemented method for acquiring and discharging of short sale stock locates according to claim 1, wherein said watchlist screen further comprises: a change column, said change column configured to display a change in a current rate from the previous day's close of each of said transmitted available stock locates.

9. The computer-implemented method for acquiring and discharging of short sale stock locates according to claim 1, wherein said watchlist screen further comprises: a from open column, said from open column configured to display a change in a current rate from the day's opening for each of said transmitted available stock locates.

10. A computer-implemented method for locating one or more shares of a stock being held long by an owner willing to lend them for a short sale, and for intraday acquiring and discharging of short sale stock locates for an investor, said computer-implemented method comprising:

configuring one or more first client devices for continuously transmitting its respective available stock locates usable for the short sale and corresponding locate rates for one or more stocks symbols over a network to a server, configuring the server for continuously monitoring said transmitted available stock locates and corresponding locate rates for the one or more stock symbols by each of the one or more first client devices;

configuring the server for hosting a graphic user interface (GUI) configured for displaying: a watchlist screen;

configuring the server for displaying, in the watchlist screen,
a stock symbol entry box,
a locate share quantity entry box,
a limit price box,
a locate button; and
an inventory quantity box;

configuring one or more investor client devices for accessing the GUI of the server;

entering, by a first investor in a first one of said one or more investor client devices, in the stock symbol entry box of the GUI, a stock symbol of a stock for which the first investor needs a short sale stock locate;

comparing said entered stock symbol to each of said transmitted available stock locates of the one or more first client devices, and displaying, in the watchlist screen of the first investor, a limit price of said entered stock symbol transmitted as being available from the one or more first client devices;

entering of a locate share quantity for the entered stock symbol, by the first inventor, in the locate share quantity entry box, and toggling the locate button;

allocating the entered locate share quantity for the entered stock symbol, to the first investor, and removing, by the server, of the allocated locate share quantity for the entered stock symbol from said transmitted available stock locates;

displaying the allocated locate share quantity in the inventory quantity box of the first investor;

configuring the server for displaying an order entry screen for the first investor, displaying, in the order entry screen:
- the allocated locate share quantity,
- a short button, and
- a cover button;

toggling, by the first investor, of the short button for using the allocated locate share quantity for short selling of the entered stock symbol;

configuring the server for displaying an inventory screen in the GUI of the one investor client device;

displaying, in the inventory screen:
- the allocated locate share quantity identified as being unavailable;

toggling, by the first investor, of the cover button in the order entry screen, for covering of the used locate share quantity;

displaying, in the inventory screen:
- the covered locate share quantity identified as being available,
- a limit price entry box; and
- a credit button;

entering, by the first investor, of a desired limit price in the limit price entry box for the covered locate share quantity;

toggling, by the first investor, of the credit button in the order entry screen; and offering the covered locate share quantity, by the server, for immediate intraday selling of the covered locate to a second investor using a second one of said one or more investor client devices.

* * * * *